United States Patent [19]

Sandberg

[11] Patent Number: 5,592,625
[45] Date of Patent: Jan. 7, 1997

[54] APPARATUS FOR PROVIDING SHARED VIRTUAL MEMORY AMONG INTERCONNECTED COMPUTER NODES WITH MINIMAL PROCESSOR INVOLVEMENT

[75] Inventor: Jonathan Sandberg, New York, N.Y.

[73] Assignee: Panasonic Technologies, Inc., Secaucus, N.J.

[21] Appl. No.: 461,390

[22] Filed: Jun. 5, 1995

Related U.S. Application Data

[63] Continuation of Ser. No. 286,794, Aug. 4, 1994, Pat. No. 5,522,045, which is a continuation of Ser. No. 859,087, Mar. 27, 1992, abandoned.

[51] Int. Cl.⁶ .................................................. G06F 13/00
[52] U.S. Cl. ........................ 395/200.08; 395/200.01; 395/412; 395/413; 364/228; 364/228.1; 364/229; 364/242.94; 364/243.1; 364/260; 364/260.1; 364/DIG. 1
[58] Field of Search ........................... 395/800, 200, 395/200.13, 287, 444, 877, 416, 325, 500, 425, 400, 200.08, 200.01, 200.16, 412, 413, 824, 878; 364/DIG. 1, DIG. 2

[56] References Cited

U.S. PATENT DOCUMENTS

| | | | |
|---|---|---|---|
| 4,240,143 | 12/1980 | Basemer et al. | 395/284 |
| 4,371,929 | 2/1983 | Brann et al. | 395/425 |
| 4,430,705 | 2/1984 | Cannavino et al. | 364/200 |
| 4,481,578 | 11/1984 | Hughes et al. | 395/425 |
| 4,562,539 | 12/1985 | Vinee | 395/200 |
| 4,720,784 | 1/1988 | Redhakrishnan et al. | 395/287 |
| 4,742,447 | 3/1988 | Duvall et al. | 364/200 |
| 4,777,595 | 10/1988 | Strecker et al. | 395/200.17 |
| 4,843,542 | 6/1989 | Dashiell et al. | 395/425 |
| 4,926,322 | 5/1990 | Stimac et al. | 364/200 |
| 4,994,963 | 2/1991 | Rorden et al. | 395/325 |
| 5,020,020 | 5/1991 | Pomfret et al. | 395/200.16 |
| 5,047,917 | 9/1991 | Athas et al. | 395/877 |
| 5,163,131 | 11/1992 | Row et al. | 395/200 |
| 5,202,887 | 4/1993 | Ueno et al. | 371/10.1 |
| 5,206,946 | 4/1993 | Brunk | 395/500 |
| 5,214,775 | 5/1993 | Yabushita et al. | 395/444 |
| 5,220,657 | 6/1993 | Bly et al. | 395/425 |
| 5,222,217 | 6/1993 | Blount et al. | 395/315 |
| 5,222,224 | 6/1993 | Flynn et al. | 395/425 |
| 5,239,643 | 8/1993 | Blount et al. | 395/425 |
| 5,276,806 | 1/1994 | Sanberg et al. | 395/200 |
| 5,301,287 | 4/1994 | Herrell et al. | 395/400 |
| 5,327,570 | 7/1994 | Foster et al. | 395/800 |
| 5,386,524 | 1/1995 | Lary et al. | 395/284 |

FOREIGN PATENT DOCUMENTS 0360153  3/1990  European Pat. Off. .

OTHER PUBLICATIONS

Notes: References were cited in the parent case US patent. #5,522,045.

Primary Examiner—Meng-Ai T. An
Attorney, Agent, or Firm—Amster Rothstein & Ebenstein

[57] ABSTRACT

The invention relates to general purpose interprocessor communication implemented through a distributed shared memory network connecting a plurality of processors, computers, multiprocessors, and electronic and optical devices. The invention teaches an apparatus for shared memory based data transfer between a multiplicity of asynchronously operating devices (processors, computers, multiprocessors, etc.) each using possibly distinct memory address translation architectures. The invention further teaches shared virtual memory network communication and administration based on a unique network memory address translation architecture. This architecture is compatible with and augments the address translation and cache block replacement mechanisms of existing devices. More particularly, the invention teaches an adapter card having input/output buffers, page tables and control/status registers for insertion into an operating device, or node, whereby all address translation, memory mapping and packet generation can be implemented. The invention teaches that all network activities can be completed with only write and control operations. An interconnecting switch part and bus arrangement facilitates communication among the network adapters.

6 Claims, 5 Drawing Sheets

APPARATUS FOR PROVIDING SHARED VIRTUAL MEMORY AMONG INTERCONNECTED COMPUTER NODES WITH MINIMAL PROCESSOR INVOLVEMENT

This is a divisional of application Ser. No. 08/286,799 filed on Aug. 4, 1994 U.S. Pat. No. 5,522,045 which is an FWC of Ser. No. 07/859,087 filed Mar. 27, 1992, abandoned.

The invention relates generally to the sharing of memories distributed among remotely located nodes in a network. More particularly, it teaches a method and means for asynchronously operating distributed nodes to write not only to the physical memory of interconnected computers but also to access virtual memory caches directly and to map into a shared virtual memory space for intercommunication.

BACKGROUND OF THE INVENTION

Data processing needs have increased from the development of the multiprocessor system to increasingly sophisticated multi-computer arrangements. In the multiprocessor realm, the processors interact in performing programs and sharing resources such as input and output devices. Generally, the multiple processors in such a system share data which is resident in a common memory. In addition, each processor may have sole access to an additional memory for non-shared data. With regard to that memory which is shared, the various processors must compete for access to the data which results in inefficiencies of both time and resources.

Multi-computer systems frequently operate with multiple nodes each having its own copy of the shared data. In order to keep the shared memories consistent, each node has direct access to the other node's stored data, or "physical memory", so that it can write updates to the shared data in all relevant locations simultaneously. A problem with the shared physical memory concept is that there may be a conflict between the nodes if more than one attempts to write to the same location in memory. Moreover, a node must remain inactive while another node's update is being written into its memory space. In addition, in a system with more than two nodes sharing a memory where only one update is being written at a time, it is not only possible, but quite likely, that corresponding memory locations on different nodes will contain different values, one having been updated and another not. The sharing of memories has generally required that the shared data be held in a fixed set of locations in each node space to allow direct access by another node in the network. This sharing of fixed location physical memory prevents the individual nodes from most efficiently allocating their own memory space. Extending the memory sharing concept beyond two machines is rather difficult given the foregoing obstacles.

Interprocessor communications are limited by the bandwidth capabilities of the network as well as the coordination problems discussed above. Many of the newly proposed high speed computer network architectures are moving away from bus and ring based physical connections to central switch-based connections. The switching network architectures promise the higher data transmission speeds and network throughput required for visualization and multimedia applications running on distributed systems. Moreover, network architectures based on fast switching technology may substantially eliminate the interprocessor communications bottleneck which plagues commercial computer networks from personal computer to supercomputer systems. Eliminating the interprocessor communications bottleneck requires network data transmission at SRAM access rates, that in turn requires the solution of two problems of approximately equal importance. These problems can best be described with reference to FIG. 1, which shows two computers or nodes, 10 and 11, connected by links to a network. Each of the computers consists of a processor (P), 12 and 13, a memory (M), 14 and 15, and a network adapter (NA), 16 and 17. The lines labeled "A", 18 and 19 connecting the memory to the network adapter on each computer, represent the bandwidth from the user memory address space to the output port of the network adapter hardware. The lines labeled "B", illustrated as 20, represent the bandwidth available through the network, that is, from the output port of the network adapter, for example 16, to the corresponding input port of another network adapter, 17 herein. Typically, the goal of interprocessor communication is to move data from one computer's memory space to one or more other computers' memory spaces. Hence, the bandwidths represented by "A" and "B" are both relevant to network performance.

The first problem is the network bandwidth problem of how to readily and reliably multicast data over a potentially large network, as would be required for updates to distributed shared memory. Unless the bandwidth, "B", is preserved across the network, the network transmission will remain in the bottleneck for distributed systems. Once data is presented to the network, how it is routed and delivered to a designated set of network destinations is critical to eliminating network "congestion". The sharing of distributed memory eliminates memory-read communications between interconnected machines, since each site in the network has a copy of the memory. In order to maintain the most current copy of the memory at each location, however, memory-writes or updates must be multicast throughout the network whenever they occur. The multicasting of memory updates can rapidly create backlogs within the network. The second problem encountered when confronting the interprocessor communications bottleneck is the process-to-process bandwidth problem. One needs to optimize loading data to and storing data from the cable connecting the user memory, and hence the processor, to the network, line "A" at 18 and 19 of FIG. 1. If user processes have access to only a fraction of the bandwidth, then connections to and from the network will remain in bottleneck. Much attention has been directed to solving the network bandwidth problem, resulting in most networks having the property that "B" is much larger than "A". There remains the problem of how the user processes or memory spaces on nodes and personal computers can access the rapidly improving network performance.

Areas of interest for improving the large-scale networking of computers therefore include addressing the following concerns: the bandwidth capabilities of the network; the process-to-process bandwidth available to the individual processor; the generating, broadcasting, queuing and receipt of shared memory writes; and, the interconnection of a wide variety of locations having the same or different operating systems.

A system which provides distributed nodes in a network sharing distributed memory and having the capability of writing into each others local memories is described in European Patent application number 89117024.3, entitled "Oblivious Memory Computer Networking" and published on Mar. 28, 1990 under publication number 0 360 153, corresponding to a U.S. patent application Ser. No. 249,645. The communications network which is described therein provides for any machine in the network to write into the location of the distributed shared memory of another machine. The teachings provide file registers associated with the shared memory which contain the physical addresses of the corresponding locations of shared memory in the interconnected machines. A write operation to a linked, so-called victim, node is to the physical memory whose address is resident in the file register associated with the addressing, or host, unit. The network location is memory-mapped to the physical memory location such that the host computer "looks up" the location of the desired file and prepares an address packet to the victim location in the distributed shared memory. The 0 360 153 system improves upon the prior art by providing for the transmission of data in the network at main memory speeds, primarily through the elimination of acknowledgement messages, thereby minimizing the network bandwidth problem. By eliminating the acknowledgement mechanism, the teachings adhere to a weak consistency scheme, whereby the requirement of strict consistency among the shared memory locations is foregone. A further enhancement found in the 0 360 153 teaching is that the host, or sending, processor is not required to suspend operations throughout a cycle of both the victim processor receiving and processing the update. The actual network transmission and the internal memory store transaction, from network adapter, for example 16, to memory space, 14 of computer 10, is conducted without involvement, or even "awareness" of the host processor. The write process allows the host processor to be oblivious to all actions subsequent to the sending of the update. A drawback to the weak consistency model is that the updates to the shared memory location must be implemented in the order in which they are generated. The memory-mapped interrupt mechanism found in the 0 360 153 teaching is also problematic because it is non-selective. Often a location process wants to generate an interrupt exclusively on the leader process to request some network service. In order to raise an interrupt on one target machine, all of the associated machines must field the interrupt. The interrupt mechanism is important, as noted above, for initializing data transfers or requesting services wherein the target of the interrupt is only one processor. Although there are instances in which one would need to generate a universal interrupt, it would be desirable to have the capability of generating either selective or multicast interrupts in a network, allowing as many entities to continue operating in spite of ongoing network communications. An additional drawback to the 0 360 153 system is that in order to facilitate the memory updates, the physical memory locations are "mapped" into registers located in each of the interconnected nodes. The physical location of the shared memory cannot be changed by the local processor, thereby limiting its ability to most advantageously allocate its memory space.

A system developed by Nigel Llewelyn Vince, and disclosed on May 11, 1988 in European Patent Publication 0 092 895, based upon European Patent Application number 83311516.8, discloses a means for accessing the memory of an associated processor using a virtual address. The file registers associated with the host processor, and resident in each of the interconnected processors, contains a virtual address for each of the memory locations. The host processor assembles the write packet containing the virtual address and the update. The victim processor receives the packet and subsequently "decodes" the virtual address in order to access the physical location of the memory to be updated. All incoming packets must be received in the order in which they were generated. Vince teaches the preferred embodiment utilizing a token ring which necessitates packet ordering. Although the extended teachings in the Vince application discuss the use of interconnection networks other than a token ring, it is required therein that the packet ordering feature be preserved, by the use of counters or other means. Such a packet ordering requirement limits the ultimate speed of an interconnection system.

The capability of virtual memory mapping to provide access to not only physical but also virtual memory addresses throughout the network can increase the efficiency of the network tremendously. Extending the virtual memory addressing concept to direct network access to a virtual shared memory would facilitate network communications and permit instantaneous memory updates without the necessity of processor intervention. In addition, the virtual memory space can be significantly larger than the actual underlying physical memory.

It is therefore an objective of the present invention to provide virtual shared memory throughout a widely distributed network.

It is a further objective of the present invention to provide network access to a virtual shared memory without processor involvement.

Another objective of the invention is to provide virtual memory mapping and accessing capabilities to an existing network.

A further objective is to provide interconnection between nodes running on different operating systems and having different main memory byte orders.

Still another objective is to provide dynamic reconfiguration capabilities to an existing network.

SUMMARY OF THE INVENTION

These and other objectives are realized by the invention wherein an inventive adapter card is provided to an existing node and further interconnected to the network via an inventive switch port and bus arrangement. The adapter and switch ports comprise control and status registers, page tables, input and output FIFO's and link hardware which provide superior memory mapping not only to physical and virtual memory addresses, but also to network virtual shared memory addresses wherein network communications can be conducted. Further included in the adapter configuration is a physical memory which contains the memory values shared among the interconnected network locations. The adapter network is a distributed shared memory connected through full duplex links to a mesh connected circuit switching network. The network adapters use the preloaded page tables and run-time address translation at the switch ports to route and multicast network packets. The invention provides a network which can be used to interconnect an arbitrarily large number of high-speed nodes or processors over a wide geographical area and would be scalable to accommodate a wide range of number, location and type of networked processors.

The invention will be detailed both in arrangement and operation by the following description with reference to the accompanying Figures wherein:

DETAILED DESCRIPTION OF THE PREFERRED EMBODIMENTS

Figure 1:
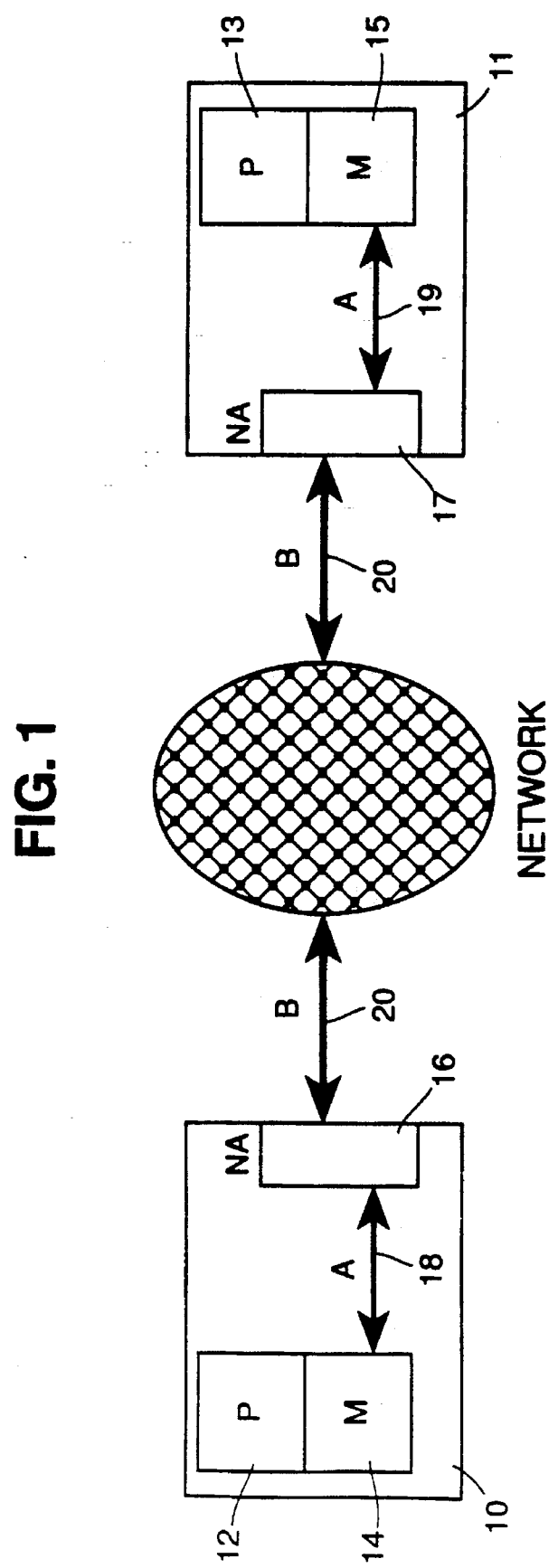
FIG. 1 is a schematic drawing of a network interconnecting multiple processors or nodes.

The present invention provides the method and means for conducting interprocessor network communications at a shared virtual memory level. It should be noted at this point that the present invention relates to a novel structure which has, as components, some well-known computer circuits, devices and functional units which are not detailed in this description. Accordingly, the structure, control and arrangement of these well-known circuits and devices are illustrated by the use of readily understandable block representations and functional diagrams that show only the specific details pertinent to the present invention. This is done in order not to obscure the invention with structural details which would be readily apparent to those skilled in the art in view of the functional description of same. Also, various portions of these systems have been consolidated and functionally grouped to stress those features pertinent to the invention. The following description will allow those skilled in the art to appreciate the possibilities and capabilities of the disclosed invention and further will allow its ready incorporation into any one of a variety of computer architectures. The system which will realize the advantages of the present invention must be equipped to provide superior network-to-bandwidth performance. Presently available hardware which, although not critical, would facilitate the implementation of the invention include both optical and electronic parts such as AMD TAXI(a trademark of AMD) chips which can perform parallel-serial clock recovery data transmission; optical data links that perform optoelectronic conversion; input and output FIFO's for buffering and flow control; and, SRAM's. Notable in its absence from the list of critical components is an on-board protocol processor, the presence of which is obviated by the present invention.

Throughout the following description of the invention, certain broad terms will be used for consistency and clarity of the description. The inventor does not wish to be limited to a strict construction of those terms where it is clear that a broader aspect of the technology is intended. In particular, the following terms will be used in a generic sense:

node will be used to denote an independent operating device including, but not limited to, a processor, a computer, a supercomputer or a multiprocessor;

processor will be used to refer to the controlling processor in a node;

host processor will be used to refer to the processor in one node which is issuing a write or control command which will then be communicated to the receiving or victim processors;

interprocessor refers to both the network and communication in that network between independent nodes.

Essentially, conceptually, the computer nodes in the subject invention are linked, via memory mapping, to a virtual address space which is accessible by simply repeating memory bus writes or control commands over the network. Programs executing at nodes share one or more segments of virtual memory and use these segments as if the segments were part of each program. The shared segments of memory are simultaneously accessible to the individual programs. Thus, networked programs can communicate with one another by exchanging data through the common memory segment. This form of shared memory communication is already supported for interprocess communication for processes communicating through shared memory, when the processes are running on the same (i.e., a single) node. The memory shared, in that instance, is the physical memory of the workstation or node. There is currently no way, absent the present invention, to use the shared memory calls at SRAM speeds, which are operational in a intra-node model, to establish communications between processes executing on multiple nodes.

Conducting interprocessor communication at such a low level of memory has both advantages and disadvantages. The disadvantages include the need for a new shared memory programming model and the need for data type conversion when transmitting certain types of data (e.g. floating point numbers) between different computer architectures. One skilled in the programming art can readily compensate for these relatively minor inconveniences. The advantages include little or no reliance on operating system features for interprocessor communication. The limited operating system involvement follows from the memory mapping of interprocessor communications. In addition, the network communications and shared memory interactions can access the node's internal memory store without limiting the node in its ability to allocate the memory in suitable caches which are accessible without being assigned to a fixed physical memory location. The system allows a node to continually manage its memory space, including designating certain of its virtual memory pages as shared, providing memory location updates to the page tables of its own adapter card and multicasting the updates in parallel to the page tables of the other interleaved networked nodes. In this manner, each node in the network has, essentially, direct access to all levels of memory in an associated node via the virtual shared memory space. If it is desired that a node have exclusive access to certain data, the contents of each memory page of shared virtual memory will be protected through the same mechanism that any other virtual memory page is protected. Programs may be granted read/write privileges for pages that are declared publically or privately sharable. Shared virtual memory (SVM) mapped computer network routing and administration is a totally new concept. The SVM address space is independent of the users' virtual memory address space and the operating system's address space on any host node. The shared virtual memory space is designed to provide a single network-wide address space to which programs may attach a segment of their virtual memory. The system allows programs to designate any or all of their virtual memory pages as shared. Shared memory segments are not restricted to any fixed standard size. The SVM space is a linear sequence of shared virtual memory locations with possibly long addresses (for example, 128 bit length). Since the shared virtual memory space is so large, it is not likely that every shared virtual memory page will actually represent a page of physical RAM. In this case the shared virtual memory address functions simply as a name that can be used by any network program to establish a shared segment. If some process agrees to act as the guarantor for a given page of SVM, then the programs that successfully map into the given page can expect that the guarantor will send them a copy of the SVM page contents as part of the memory allocation process. The inventive system uses The SVM address space to simplify the administration of high-performance computer networking.

Figure 2:
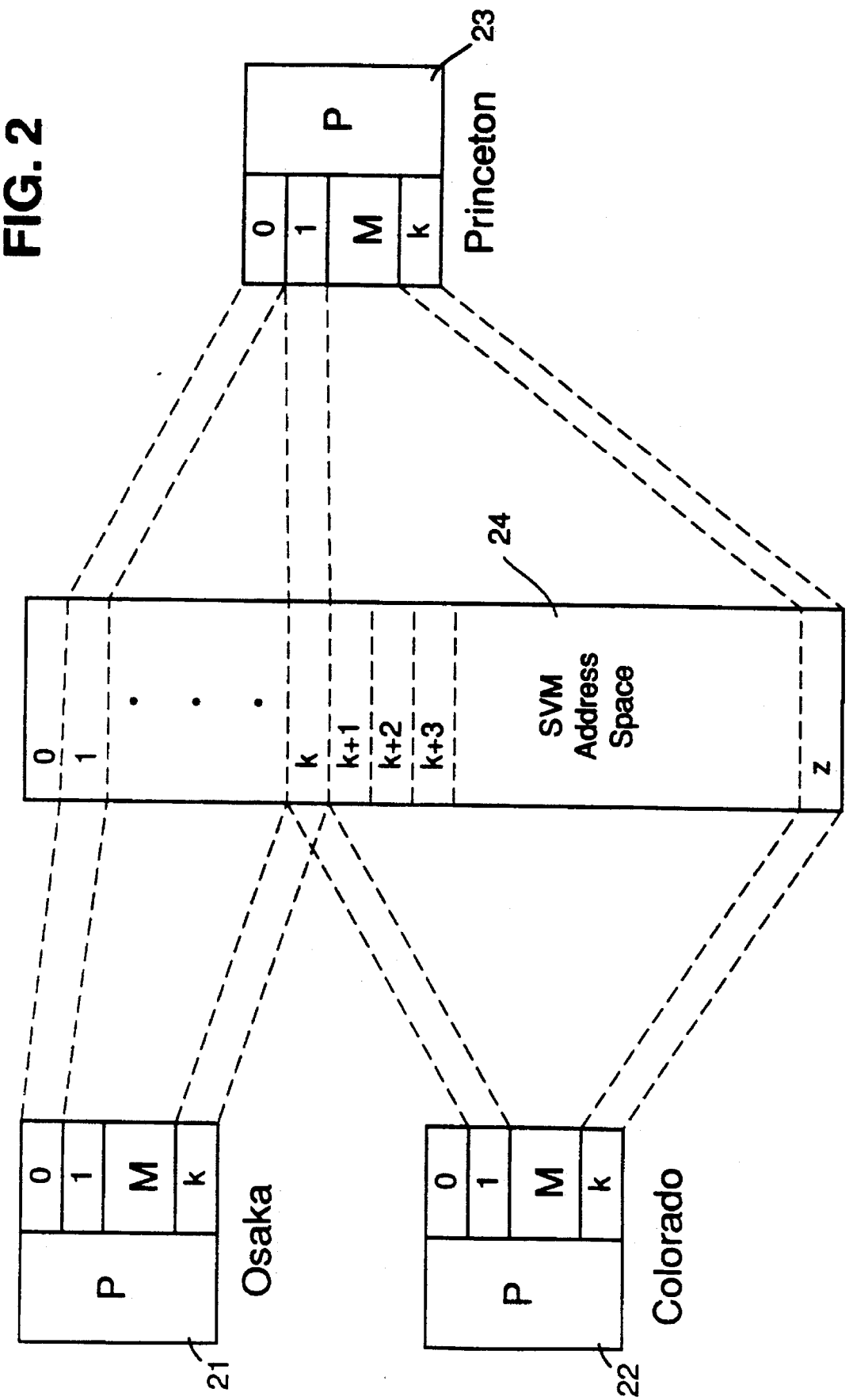
FIG. 2 is a schematic rendering of a virtual shared memory space which is memory-mapped to multiple nodes in a geographically distributed network.

FIG. 2 illustrates a memory mapping of three pages, pages 1, k and z, in the SVM address space, 24, into adapter location shared memories running on nodes located at great distances from each other. On the node found at location 21, the adapter memory page 0 is mapped to SVM page 1 which in turn is mapped to location 23's memory page 0. Locations 21 and 23 use their physical shared memory page 0 as a high speed two-way link. Location 21's memory page k is mapped to SVM page k where it can transmit data to location 22's memory page 1 and location 23's memory page 1. The nodes at the locations can conduct three-way communications through SVM page k. This is one way to multicast data in the SVM network. Each update to memory page k in location 21 is seen by locations 22 and 23 in physical memory page 1. All the address translation is performed at run-time, as will be discussed further herein.

As a network administration policy, consecutive pages of the SVM space may be statically allocated to specific nodes. The static allocation of SVM addresses will assist the rapid automatic establishment of communication channels at program's request. For example, in FIG. 2, the location 21 node may own (be the guarantor of) SVM pages k through k+100. When applications running in locations 22 and 23 require data transfers to location 21, they simply map into SVM page k to establish a communications channel. Network communication between nodes is implemented by repeating memory (bus) write or control commands over a specially constructed communication network switch and bus system (detailed below). The availability of optical, co-axial and other currently available sophisticated transmission systems with low transmission error rates makes it possible to conduct network interprocessor communication simply by repeating memory bus write requests over the network.

Figure 3:
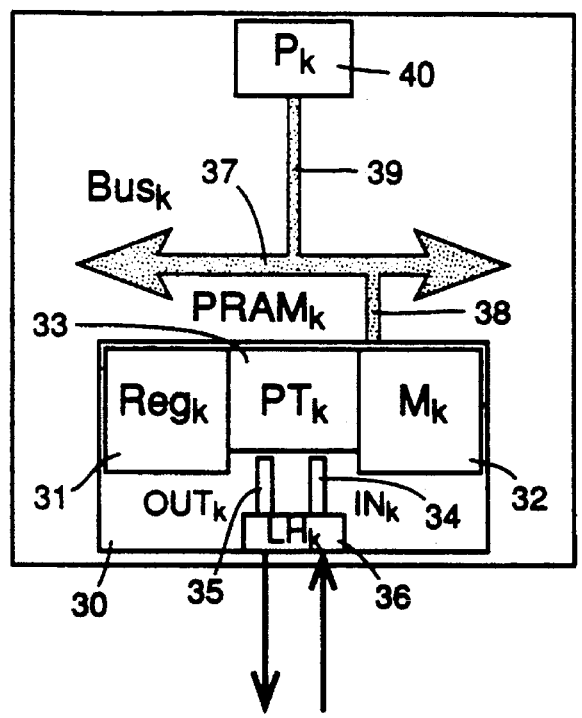
FIG. 3 illustrates an adapter card connected to a processor in accordance with the present invention.

The physical implementation of the virtual shared memory capability is found in the adapter card, 30 illustrated in FIG. 3, which consists of a variety of physical memories and a network interface. The adapter cards are designed to be inserted into existing nodes in a network, regardless of the operating system or memory address translation architecture of the node. It is not necessary to interconnect the adapter cards via a special port or bus arrangement; although the preferred embodiment currently envisioned includes an inventive switch and bus interconnection system described further below. The physical elements of the adapter card, 30, are as follows: three types of physical memory including a set of control and status registers, 31, a data location memory, 32 and a page translation table memory, 33; and network interface comprised of an input FIFO, 34, an output FIFO, 35, and link hardware, 36. The adapter is connected to the intercommunications network at the input and output FIFO's via the incoming and outgoing serial network connections referred to as the link hardware. The adapter is connected in the node to its associated processor, 40, via memory bus, 37; and appears to the memory bus and the processor as a memory card that responds to read and write commands for a designated range of physical memory addresses. In turn, the registers, page table and data location memory on the adapter all appear to the processor as simply different memory locations on the memory card.

The elements, and functions of those elements, of the adapters will now be discussed in detail, with specific reference to FIGS. 3 and 4, wherein like reference numerals are used throughout. The link hardware, 36, physically connects the adapter, and thence the node to the network. The link hardware is an important part of the network's functioning because it performs all of the point-to-point flow control, optoelectric conversion, short command decoding and hardware transmission error detection activities for its adapter and related node/processor. The link hardware can be implemented using any of the state of the art hardware which is capable of linking the optics to the adapter via the input and output FIFO's. As elements are popped off of the input FIFO, 34, they are assembled into a message and processed on the adapter card. As elements are popped off of the output FIFO, 35, they are sent through the link hardware out over the network.

The input and output FIFO's, 34 and 35, are sequential buffers which control the flow of information through the network ports of the adapter using a start/stop flow control scheme. Only one of each of the input and output FIFO's are illustrated in the Figure; however, there can be more than one of each FIFO location in the adapter hardware as determined by the node and network needs. As messages arrive from the network, they are queued in the input FIFO, in sequential locations representatively illustrated as 44 and 54 in FIG. 4. Messages from various sources may be interleaved in the network; but the order of receipt is preserved by the buffers. As the card pops the message off of the input FIFO, the control registers, 31, or memory, 32, are updated as dictated by the message contents. As memory and register writes are issued from the processor to the card, the corresponding network packets are queued in the output FIFO, delineated for illustrative purposes as locations 45 and 55, for automatic network transmission.

The control and status registers, 31 in FIG. 3, are a memory mapped user interface to the controls of the hardware. The registers include a Unique Identifier (UID), a read only register that contains an unsigned integer unique to a particular piece of the network hardware. The UID is particularly important as it is used by network software to administer and control the network hardware. In operation, all of the control messages (for dynamic reconfiguration as detailed below) are routed using the UID as the network address. Other command messages are accompanied by the UID in order to insure that the message is intended for the receiving destination. No UID-bearing network hardware components have the same UID. Certain UID values are special in that they are not assigned to any single piece of network hardware; instead they are used to match any single UID, match all UID's, and match no UID for command packet routing. The control and status registers are used to read the UID, enable the input and output FIFO's, send commands over the network and reset entries in the page table. The definition and operations of the control and status registers, 31, are not new to the present invention. As noted above, unnecessary detail of features which are well-known in the art could only serve to obscure the novel details of the invention. As illustrated in FIG. 3, at 31, and further detailed in FIG. 4, the registers are shown containing register values, in "locations" or registers 41, 51 and 61, just as the data location memory is shown containing memory values, at 42 and 52, and the page table is shown containing entries consisting of the ordered pair of physical page number and virtual memory address, at 43 and 53 for example. The input and output FIFO's are shown having locations, 44, 54 and 45, 55 respectively, for containing a queue of entries, each entry corresponding to a network packet. Although the specific details of the registers can be left to one skilled in the art, for the sake of clarity in the following description of the operations of the invention, certain assumptions will be made as to the contents of specific registers. In particular, it will be assumed that register 0, illustrated at 51 in FIG. 3, is a read only register containing the adapter's UID. Register 1, found at 61, contains only a code representing the addressing mode of the adapter, either virtual or physical addressing.

In addition to having the data location memory locations mapped into the SVM address space, the status and control registers and the page table of a location are mapped into SVM address space. The control and status registers are memory mapped into a first set of physical memory addresses. The next set of physical addresses are mapped to the page table. All the remaining physical addresses are mapped to the data location memory. The advantage of mapping the registers and the page tables into the SVM address space is that all of the network's nodes will have a uniform method of accessing and writing to the registers and page tables. It is most advantageous to map all of the registers and the page table of a node to a single set of SVM addresses to facilitate updates. This provides the network with dynamic reconfiguration capabilities whereby routing and protocol can be changed during operation without extensive hardware or programming changes.

The data location memory, hereinafter, "the memory", labeled 32 in FIGS. 3 and 4, performs the storage and retrieval functions of the distributed memory. Memory 32 may accept update requests from both the host processor, 40, of its node and the network. Typically, the onboard arbitration for the shared memory will be fast enough so that the network adapter can respond to memory requests within the host processor's standard memory cycle delay but the arbiter speed may vary in other embodiments. Only the host processor, 40, need be capable of reading the contents of memory 32 directly. The nodes connected to memory 32 over the network need only indirectly access the memory through command requests. As with the register locations discussed above, the memory page addresses are indexed into the page tables of the associated adapters at the interconnected nodes. Either the virtual or the physical address of data in a node's memory can be specified. The indexing is necessarily dynamic, with updates to the page tables being generated when a processor either changes the memory value at a location or changes the location of data in its memory hierarchy. Such updates are conducted by memory and/or page table register writes which can then be broadcast to the associated nodes.

Figure 4:
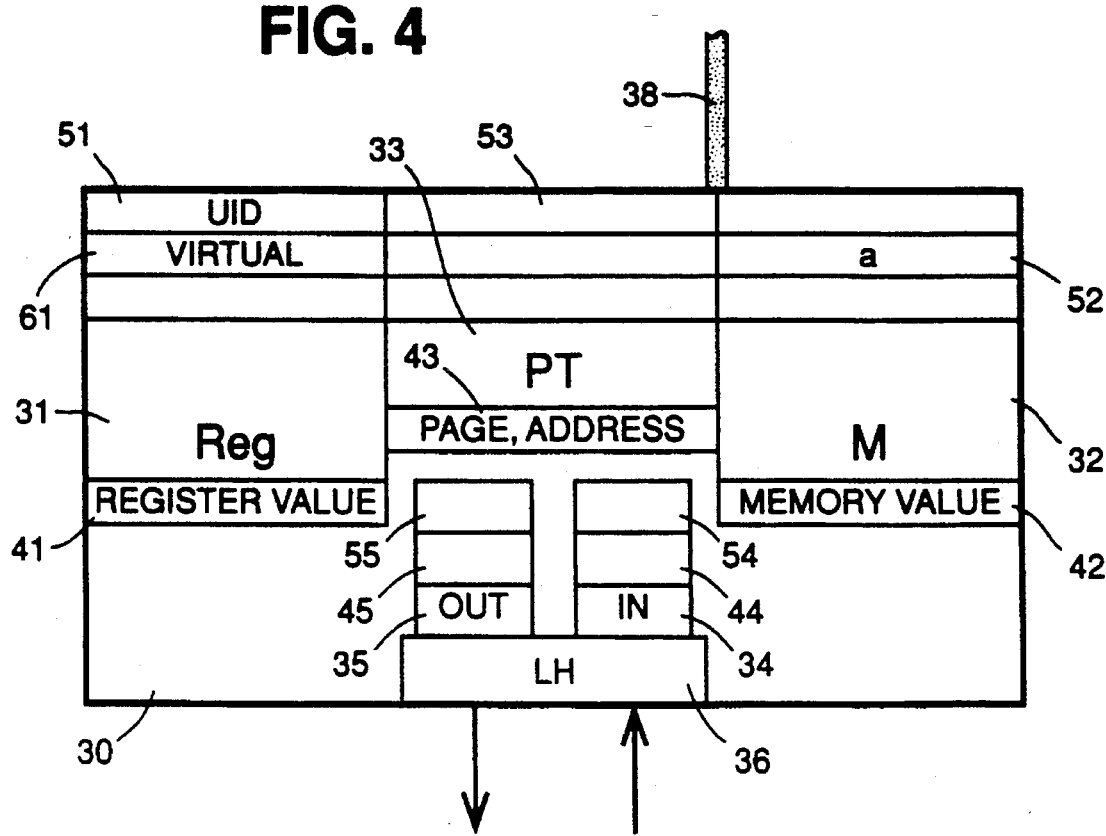
FIG. 4 is a more detailed illustration of the present inventive adapter and the physical locations therein.
Figure 5:
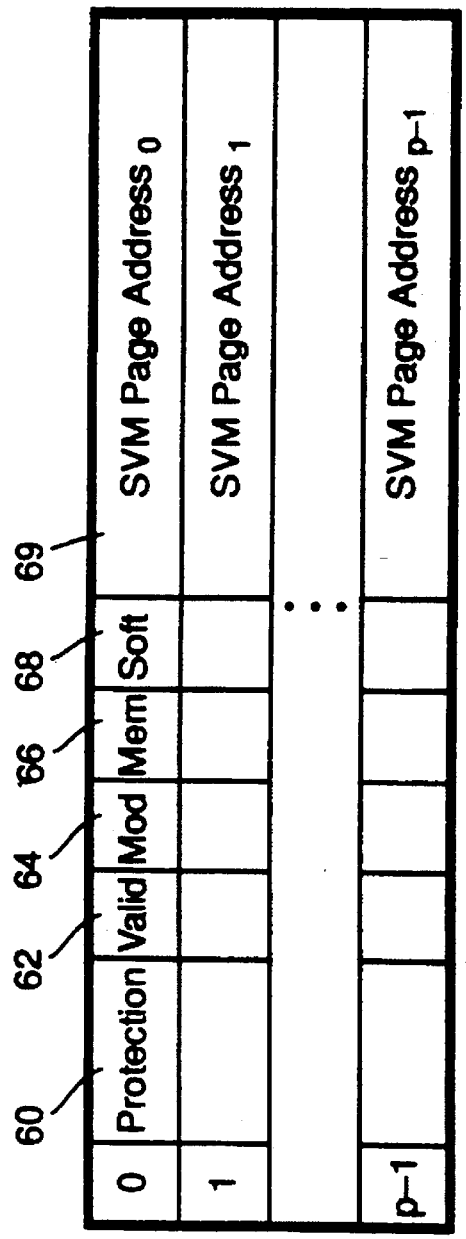
FIG. 5 illustrates the format of the information stored in the page table of the present invention.

The page table, labeled 33 in FIGS. 3 and 4, is used in the virtual memory addressing mode to translate between SVM addresses and physical memory addresses. The network adapter has two addressing modes: physical and virtual addressing. In the physical addressing mode, the network packet address is the physical address of the target memory location, for example location 52 of memory 32, and hence there is no need for any address translation. In the virtual addressing mode, the outgoing network packet virtual address is derived from the page table using the physical address as an index. If the page table lookup is unsuccessful, no packet will be generated or sent to the network. Incoming virtual addresses are also translated into physical memory addresses through associative lookups in the receiving node's page tables. FIG. 5 illustrates the format of the information stored in the page table. There are "p" entries displayed, each entry consisting of: Protection, Valid, Modification, Memory, Software usable, and Address bits. The Protection bits, at 60, allow the host processor to extend memory protection schemes to the pages of physical memory as well as the SVM pages. The Valid bit, at 62, indicates if the page table entry is currently a valid mapping between the physical and virtual address spaces. The Modification bits, at 64, indicate if any writes have occurred to the mapped page from either the host or the network. The Memory bits, at 66, identify the mapped pages as either a page in memory or a page used for mapping registers or page table storage. The Software usable bits, 68, are page table memory available to the node and system codes to implement special features. The Address bits, 69, of the entries contain the virtual memory addresses of each of the pages of physical memory. The format described as a usable format for the preferred embodiment is given for purposes of clarity. It will, however, be recognized by one having skill in the art that modifications at this level are readily incorporated to suit particular needs. Such tailoring would not change the inventive concept implemented herein.

The connections to the adapter, via the memory bus to the associated processor and to the link hardware from the network bus, can be any state of the art connectors which will provide the coupling and optoelectric conversion capability necessary for the associated components of the system. Network adapter implementations can be connected to a general purpose network; however, the shared memory programming model requires that the data packets be delivered to the target memories in the same order in which they were sent. Some optical switching networks can accommodate this requirement; however, general purpose networks do not guarantee such a property without additional hardware such as packet sequencing.

Figure 6:
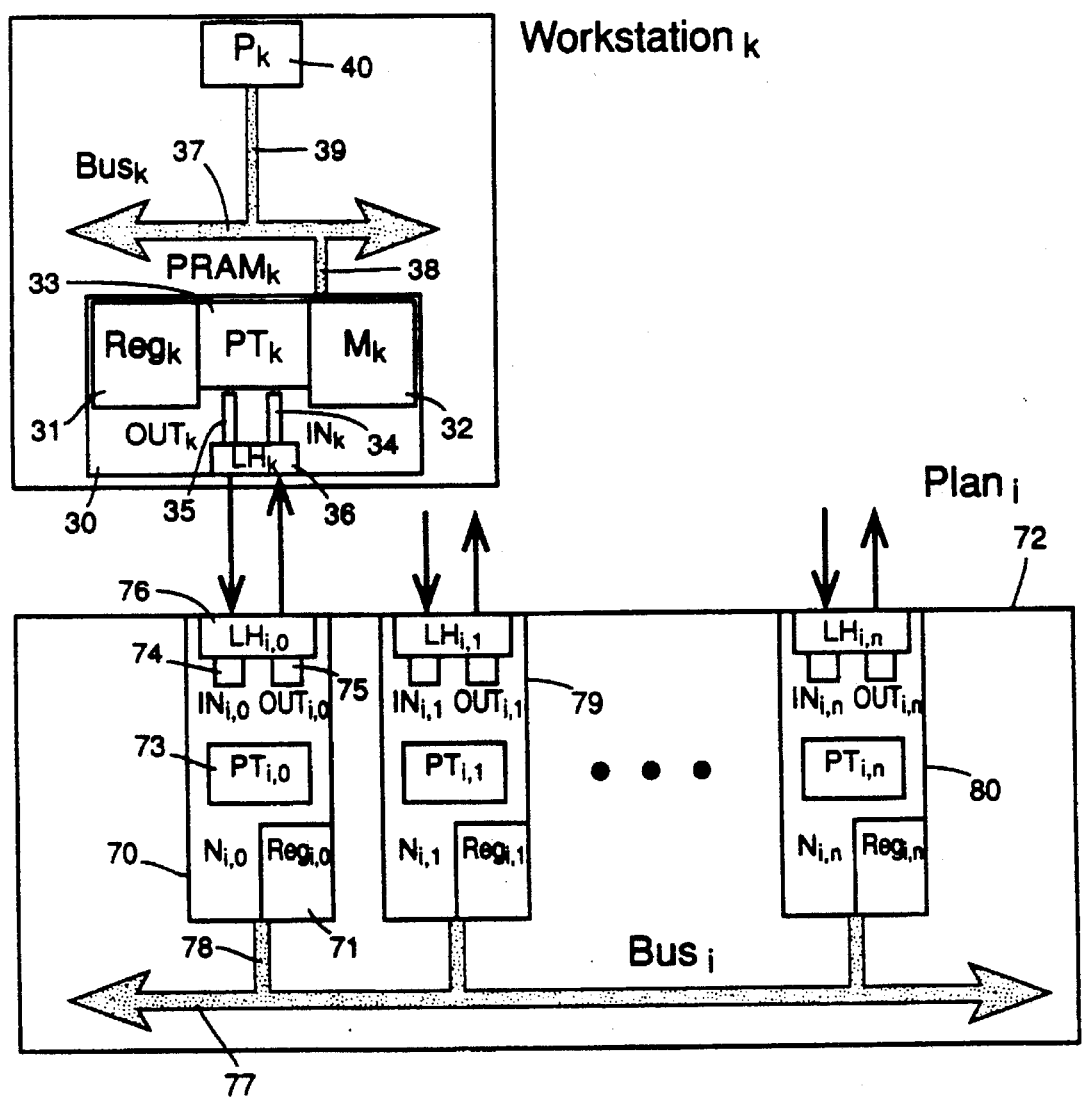
FIG. 6 illustrates a switch and bus arrangement for interconnection of the adapter cards.

A preferred switch network, suitable for connecting the inventive adapters described above, is illustrated in FIG. 6. The novel features of this switch hardware are: dynamic table driven data packet routing based on address translation, distributed spanning tree calculation and maintenance, memory-mapped switch port control and dynamic control and status register implementation. Adapter card, 30, is connected to an inventive switch, 72, through one of the switch ports, 70. Hence the input port, 74, of switch port 70 is connected by a fiber to the output port, 35, of adapter card 30. Similarly, the output port, 75, of the switch port 70 is connected to the input port, 34, of the adapter 30. In the preferred embodiment, the network adapters can be connected to the switching network through point-to-point fiber optic links. In theory, the adapter connection could alternatively employ radio, twisted pair, infra-red or coaxial cable links. The switching network, 72 of FIG. 6, is composed of a number of ports, 70, 79 and 80 for example, all sharing a common bus, 77, using time division multiplexing to service each port's data transmission request. The switch, 72, may be connected to another switch system or multiple switches to create a cascaded interconnection network, as needed. Switch ports 79 and 80, may be connected arbitrarily to adapter or switch hardware. The switch ports perform the same way independent of the hardware to which they are connected. The switch, 72, is composed of a series of switch ports, for example 70, 79 and 80, connected through a common bus, 77. Each switch port, 70 for illustration purposes, is composed of a page table, 73, a set of status and control registers, 71, an interface, 78, to the internal bus, 77, and input and output FIFO's, 74 and 75 respectively. Just as in the adapter connection to the network, the input and output FIFO's are connected to the network fiber through circuitry, 76, designated as link hardware.

The control and status registers, 71 of switch port 70 in FIG. 6, are the network interface to the controls of the switch port. The registers contain information about the switch configuration such as the switch port's UID, the number of switch ports on the bus, 77, the UID's of the adapter hardware connected to each of the ports, and the maximum data transmission speed of the switch port.

Figure 7:
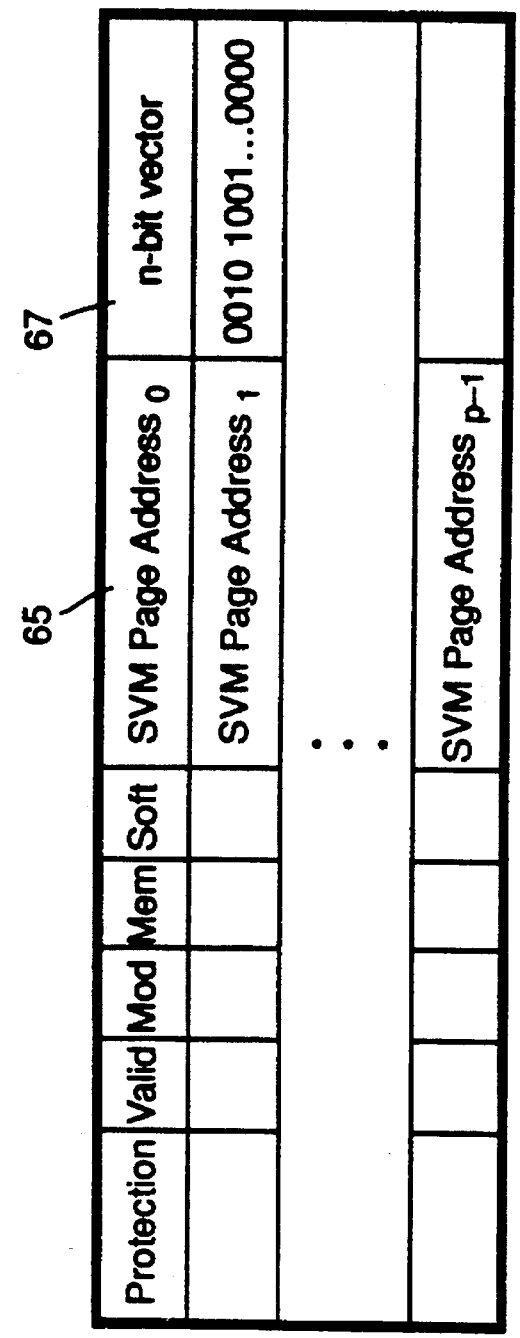
FIG. 7 shows the organization of the page table associated with a switch port in accordance with the subject invention.

The switch page tables, illustrated at 73 in port 70, are used in both the physical and virtual addressing modes to route traffic through the network. FIG. 7 shows the organization of a switch port's page table. The protection, valid, modification, memory and software bits are used for the same purposes as in the page table associated with the adapter. The addresses stored in the page table of the switch port may be physical, virtual, or a combination of both physical and virtual. The addresses of incoming data packets are used in an associative page table lookup to obtain an "n"-bit vector, at 67. The n-bit vector is used to identify which of the ports sharing the bus, 77, are targeted to receive the data packet. If the n-bit vector of a page identifies the local switch port, 70, as the target, then writes to that page will be mapped into the port's control and status registers, 71, and page table, 73. If the switch port, 70, finds a page with an n-bit vector indicating port 79 (by virtue of a "1" in the n-bit vector space associated with port 79), then all writes to that page will update the registers and page table of port 79.

The input and output FIFO's, 74 and 75 respectively, of the switch port, like their counterparts in the adapter cards, control the flow of information through the ports. Network packets received by the link hardware connected to input FIFO 74 are queued in the input FIFO, sequentially advanced and eventually popped from the queue by the switch port for processing. Outgoing network packets sent from port 70 are queued in the output FIFO, 75, sequentially advanced and eventually passed to the outgoing link hardware for transmission over the bus, 77.

The switch internal bus, 77, is responsible for multicasting packets between switch ports, e.g. 70, 79 and 80. Switch bus transactions are executed via a bus arbitration scheme essentially in a round robin fashion. When a port acquires the bus, it first passes the n-bit vector of the target ports onto the bus. Since all ports monitor the bus, a target port can refuse to receive the packet by sending an abort-transaction signal on the bus. If no signals are received back by the sending port, the data packet will be sent over the bus, latched by each of the target ports and queued in the input FIFO's. The Memory bit is typically sent along with the data packet so that the target UID's know whether or not to look up the packet address in their page tables. For example, writes to switch port registers and switch port page tables would not require lookups, unlike writes destined for an associated adapter location.

The invention will now be further described in terms of its operation. As set forth in the Background section, not only can the network delay times be drastically reduced and the network integrity be maintained by multicast updates with minimal processor involvement, but the goal of virtual shared memory can also be realized by the subject invention. With respect to the virtual shared memory, it has been stated that the virtual memory space associated with a node is separate from either its physical or its virtual shared memory address space. The network communications between distributed nodes, as were generally discussed with reference to FIG. 2, are conducted by "mapping" into the virtual memory space allocated to the target nodes. All communications take the form of memory writes and occur as a side effect of a processor or a program writing into its own local adapter virtual memory space. Additional internode information transfer, such as command packets and control register updates, will also be accomplished by mapping into the SVM pages allocated to the control and status registers and page table network addresses.

There are two types of messages that an adapter card can both send over the network and respond to: command and data messages. Command packets support the transmission of data between two or more network adapters to update the control registers or elicit responses from remote adapter cards. Command packets are used to perform point-to-point flow control (short command packets) and to perform network system error detection and recovery, establish communications channels, obtain status reports from network adapter hardware, and dynamically reconfigure the network (long command packets). As further discussed below, the execution of short commands differs from the execution of long command packets. A short command never enters the input FIFO, 34, from the link hardware, 36. Instead, the link hardware, 36 either executes the short command or passes it around the input FIFO, 34. Data messages or packets cause updates to the adapter memories. Under certain circumstances, control and data messages will be generated indirectly by direct memory access (DMA) device activity on the memory bus; automatic network flow control and FIFO management; or, remote network adapter operations. One operational format for the command packets is as illustrated in Table 1, below:

| Short Command | Long Command | Data |
| --- | --- | --- |
| Header (1) | Header(1) | Header(1) |
| Error (2) | UID (8) | Address( ) |
| Trailer(1) | Address ( ) | Date ( ) |
|  | Data ( ) | Error( ) |
|  | Error ( ) | Trailer (1) |
|  | Trailer (1) |  |

The parenthetical designations indicate the length in bytes of the respective fields. Those fields which are of variable length are indicated with no digit in the parentheses. The leading byte in every packet is the Header which determines the type (command or data), size and format of the rest of the packet. If there is an address field in the packet, then bit 1 in the header indicates whether the address can be interpreted directly as a physical memory address or indirectly as a virtual address. Virtual address translation will require the adapter hardware to access a local page table. The UID, as discussed above, of the long command packet contains a 64-bit number that uniquely identifies a single piece of hardware.

Executable operations arrive at the network adapter through one of two ports: either the memory bus interface, 38 of FIGS. 3 and 4, or the link hardware, 36. All of the operations described below require exclusive access to the adapter for the duration of their execution. Thus the execution of an adapter memory bus operation temporarily shuts down the operation flow from the input FIFO, 34, although the FIFO can still accept and queue packets. Conversely, the execution of a network packet from the input FIFO temporarily blocks incoming host memory traffic. The host processor is not interrupted in all of its operations; however, it can not access its adapter for the duration of the network-generated operation. There are five basic operations involving an adapter card:

1) A processor reads or writes the adapter memory;

2) A host device block reads or writes the adapter memory;

3) A processor reads or writes the page table or registers;

4) A network device executes a write or a block write; or

5) A network device writes the page table or registers.

In the first three basic operations the host processor 40, or DMA device, accesses the memory, 32, page table, 33, or control and status registers, 31, through read and write operations along memory bus, 37. The host processor or DMA device supplies a physical address and, in the case of a write, the update value or values. The latter two operations are invoked when a network packet arrives at an input port, for example via link hardware 36. Execution of a network packet, either data or command, can also result in updates to the memory, 32, page table, 33, or registers, 31.

In the first operation, processor, 40, executes read and writes instructions to the adapter memory, 32. The command read (52) executes as processor, 40, reads location 52 from memory 32. With command write (52, a), processor, 40, simultaneously writes the value a to location 52 in memory 32 and queues a message write (52, a) in the output FIFO for eventual transmission through the network. In the physical address mode, the value used for the address corresponds to the physical offset of the memory location, 52 in memory 32 and the message write (52, a) is sent. In the virtual addressing mode, the address value in the command is the page table entry PT(52) corresponding to the physical address 52 in memory 32, and the message write (PT(52), a) is sent. The actual sequence of operations for a virtual memory addressing operation is detailed as follows: first, the write command arrives from processor, 40, on the memory bus connection, 38, with the write command. The adapter card decodes the write command and updates the memory, 32 by putting the new value, for example a, into the designated location, 52 herein. The adapter card now looks up the SVM page address corresponding to the physical memory page. The adapter card determines that it is in virtual addressing mode by referring to register 61, which reflects the virtual or physical addressing mode indicated by the Header field accompanying the packet. Next, the adapter card creates a network write packet with the address determined by the SVM page address from the page table, 33, lookup and the page offset and queues this packet in the output FIFO, 35. At this point the execution of the write command on the adapter is completed from the point of view of the host processor so control is returned to The host. Finally, after the network write packet traverses the output FIFO, 35, the packet is sent through the link hardware, 36, to the transmission line. If the write is executing in the physical addressing mode, there would be no need to translate the physical address through the page table. The physical address would be sent out to the network in the network data packet write (52, a).

The next operation to be detailed is the host device block read or write to the adapter memory. First, the DMA device, not pictured, sends a command on the memory bus, 37. In a block write, the command would consist of an address followed by any number of bytes of data. When received at the adapter, through memory bus connection 38, the DMA data is used to update the memory at the designated locations. At this time, the DMA has exclusive control of the adapter. While the memory location is being updated, a network packet containing the address and the update values is created. No page table lookup is performed if register 61 indicates that the adapter is in the physical addressing mode. The packet is then queued in the output FIFO, 35. After the network packet is stored in the output FIFO 35, the adapter hardware signals on the host memory bus, 37, that the DMA write is complete, and that control is now returned to the host processor. Finally, the network packet flows through the output FIFO, 35, and is sent out over the network. In the case of a block write in the virtual addressing mode, the physical address will be translated through the page table. The virtual address sent in the network packet will be PT(52).

The control and status registers, 31, and the page table, 33, entries are read and written by the host processor, 40, simply as memory. Thus specific registers and page table entries are accessed by the host processor using physical addresses recognized by the adapter hardware. The writes to the control and status registers have potentially significant side effects. The updates to the page table have no special side effects other than the possible retransmission of the update over the network. Each processor, 40, executes read and write control register/page table instructions to the network adapter as follows: first, the host processor, 40, writes to the registers, for example 31, using the same command as is used for memory writes, for example write (51, UID). The control and status registers and page table are simply memory mapped to physical memory addresses that are distinct from the memory, 32. Next, the write value, UID, is stored in the appropriate location, in this example 51. The updating of the register may, in selected cases, cause a side effect such as the issuing of a long command packet to the network, as in this example. A long command packet is generated and queued in the output FIFO, 35. Next, since the bus update operation is complete, the network adapter, 30, signals the host processor, 40, through the memory bus, 37. Control is now returned to the processor. Lastly, the command packet flows through the output FIFO, 35, and is sent out over the network. In the virtual addressing mode, the register or page table memory may be mapped out onto the network through entries in the page table. In that case, when a value is written by the host processor into the registers or page table, a network data packet is generated using the virtual address PT(51) and the update value. This data packet is entered into the output FIFO, 35 before any long command or data packets are issued as a side effect. Control returns to the host processor only after the last side effect packet generated by the update has been queued in the output FIFO, 35. If the packet which is generated as a side effect is a short command packet, the process is considerably shorter. After the register has been updated and the short command packet has been generated, the command packet skips by the output FIFO, 35, and goes directly to the link hardware, 36.

Network operations arriving at the adapter through the link hardware, 36, are queued in the input FIFO, 34, except in the case of the short command packets mentioned above. The data messages are used to update the physical memory locations, 32, corresponding to the writes performed at remote nodes by their processors on their respective adapter cards. In the virtual addressing mode, a data message may update the control and status registers and page table provided that the page table is set properly. All data messages are routed through the switching network using page table routing. Since the differences between block and non-block writes are minor, the details will be given for only the block write example. When a block write network packet arrives on the incoming network transmission line the Header byte indicates whether the physical or virtual addressing mode is required. For this example, a virtual addressing situation is "indicated" which will necessitate an associative page table lookup for an incoming SVM packet. First, an incoming packet is received by the link hardware, 36. Next, the data packet is queued in the input FIFO, 34. After the packet traverses the input FIFO, 36, it is decoded and the virtual address is translated through the page table by an associative lookup. In the address resolution, the index of the SVM page is consulted to obtain the physical memory page number. Finally, the adapter card writes the block of data to the memory, 32, using the physical address obtained by the lookup. In the virtual addressing mode, the address of the incoming packet may designate an update for the registers, 31, page table, 33, or the memory, 32, depending upon the contents of the page table. Updates performed in this fashion to the control registers may cause the generation of command packets that will be queued in the output FIFO, 35. An example of this would be in the dynamic reconfiguring of a system, whereby the execution of one command packet may require the generation of both command and data packets to be sent throughout the network. Network updates to memory, 32, will not, in general, cause any network packets to be generated.

When executing network block write operations, the host memory bus, 37, may be blocked for an extensive period while the block operation is executing. One way to allow the processor to perform local adapter memory references during the network execution of a block write is to interleave local reads and writes with the network block write. Buffering local network adapter memory writes from the host memory bus interface would also be effective.

Finally, the network writes to page tables or registers are detailed. Command messages are generated and sent through the network in response to a processor writing into a selected set of command registers. The host processor selects a target for the command by specifying a target UID. The UID value is sent along as the first argument in the command packet. The command packet is routed through the adapter network according to a spanning tree computed at start-up. When a command message is popped off the input FIFO, 36, it may cause either a register copy or a register write function to execute. In this example, the command is a $register_{13}$ write( ). If the command received was instead a regcpy( ), the only difference in processing would be a different side effect from that of the $register_{13}$ write( ). In the $register_{13}$ write( ), first the command packet is received by the link hardware, 36. Second, the command packet is queued in the input FIFO, 36. After traversing the FIFO, the command packet is popped off of the FIFO and its fields analyzed. If the command packet UID matches the value in register 51, it will execute. The command execution forces the blocking of the local memory bus connection while a register specified in the command's address argument list is updated with the value specified. Writing to the registers will then cause a side effect depending upon the value written, the updated register and the contents of the other registers. In some cases, the side effect of the control register update will include the generation and queuing of network packets in the output FIFO, 35.

The data packet routing is performed by translating the data packer's SVM address into routing information through a pre-loaded page table, 73 in FIG. 6 for example, associated with switching network port, 70. The routing information obtained from the address translation is the n-bit vector, at 67 in FIG. 7, that identifies target switch ports on the internal switch bus, 77. A data packet flowing through a switching network, for example along bus 77, requires one page table lookup at each port, 70, 79 or 80 for example, to find the target port. The contents of each of the switch port page tables are readable and writable to accommodate varying data transmission requirements and to control the retransmission of data packets through the network.

The switch must accept the two types of network packets, data and command (both short and long) packets and route them through the switch as dictated by the memory mapping information and the UID device addresses. The command packet routing mechanism must be different from the data packet routing mechanism since it is necessary to have the commands in order to determine the network topology and initialize the page tables that in turn perform the data packet routing. The data packets are routed exclusively using their packet addresses and the information stored in the page tables. Short command packets are routed exclusively using command packet flooding through a precomputed network spanning tree bypassing both the input and output FIFO's. Each site of the spanning tree stores a status register bit to indicate its position in the tree. Short commands execute at every network site they visit. Long commands move according to the network spanning tree, however they are only executed at sites where the UID stored in the status and control registers matches that data contained in the packer's UID field. As noted above, every adapter card and switch port stores a unique identifier in their status registers. Every long command packet contains an UID argument to be compared with the network site's UID. All long command packets are processed through the input and output FIFO's of the adapter and switch ports.

The spanning tree network is the preferred command routing scheme which is computed at network initialization and at reconfiguration points (e.g., when adding new nodes to the network). The network spanning tree is composed of sites, corresponding to adapter cards and switch ports, and edges, corresponding to operational links between network ports. The purpose of the spanning tree is to allow the hardware to flood the network with command packets but keep from perpetually retransmitting command packets through cycles in the network. After the spanning tree has been computed each switch port records, in one of its registers, whether it is an interior or leaf site in the tree. If the port is a leaf site, the command packets will not be retransmitted over the port's link hardware. If the switch port is an internal site, then command packets may be retransmitted over the port's link hardware. The advantages of automatic computation and maintenance of a network spanning tree include: network topology independence, automatic recovery from hardware failures, multipath routing between switches and dynamic network administration.

The goal of the subject invention is to provide a general networking framework that uses available memory management resources to simplify routine interprocessor communication. Mapping shared memory into the user node's virtual memory space provides a standard interface to network hardware devices and promotes the development of network independent applications. What is required of the kernel is the handling of machine-dependent aspects of network communication including low level network initialization, trap and default handling and low-level manipulation of the run-time context of a process. The memory protection features supplied by the host node are extended to the SVM network memory through services supplied by the network kernel. However, protection execution is limited in cases where host operating systems do not implement memory protection. The standard virtual memory management services may be augmented, if necessary, so that the network connection control is accomplished automatically, as detailed below. The page fault handler and the page table are modified to establish and recognize virtual memory pages mapped to SVM network virtual addresses. The effect of these modifications is that processes running on networked nodes may share arbitrarily large portions of their virtual memory spaces. The programmer's only duty, therefore, is to allocate shared memory in the node's virtual memory address space and provide target SVM virtual addresses for network packet routing. New operating systems calls or library functions have been developed for use in this context. They are as follows:

All user level network commands are mapped into four new system calls vsmget( ), vsmat( ), vsmdt( ), and vsmctl( ). These new system calls correspond functionally to the standard interprocessor communication shared memory system calls shmget(), shmat(), shmdt(), and shmctl().
The call:

int vsmget(vsmaddr, size, flags); int size flags; struct vsm vsmaddr;

returns an identifier of a region of SVM addresses that is mapped through the network to the user process. If the requested SVM region is not currently mapped, then the system call will attempt to establish the mapping.
The call:

int vsmat(id, addr, flags); int id, flags; char *addr; logically attach a region of SVM addresses to the virtual memory address space of the user process.

The call:

void vsmdt(addr); char *addr;

detaches a region of SVM addresses from the virtual memory address space of a user process.
Finally:

void vsmctl(id, cmd, vsmbuf); int id, cmd; struct vsmtab vsmbuf;

manipulates SVM mapping parameters.

All other network operations including flow control, error control, connection establishment, security maintenance, and data transfer occur automatically as a side effect of program memory reference execution.

The SVM network facilities are managed through a set of processes that function as a network kernel, the kernel running in an address space which can be protected from user processes. Each site in the network has a local SVM kernel acting on its behalf. The SVM network kernel provides the following basic facilities: network initialization and administration; connection establishment, security, routing and synchronization to networked processes. Access to these services is provided through a set of remote procedure calls or system calls. The SVM system calls are the only interface that networked nodes or processes running on the nodes have to these services.

The SVM network initialization process designates one of the SVM kernels as the supervisor node for the network. The supervisor maintains the map of the SVM address space allowing it to enforce shared memory protection between networked processes. The supervisor also maintains a "free list" of SVM addresses available for new network connections. The supervisor monitors and maintains the switching network routing tables that filter traffic between network switches and accepts synchronization requests from nodes.

An example of the initialization and operation of the SVM virtual memory management system follows. Assuming that the physical memory locations assigned to the SVMNet adapter are not cacheable and that the page table entry records if a page of virtual memory is mapped to SVMNet physical memory or to standard DRAM, then the page fault handler will use this additional page table information to reclaim pages from SVM network.

The basic SVM memory management operations are allocation, free, attach and detach. Mapping virtual memory pages to the network involves updating the adapter page table and obtaining an up to date copy of the mapped SVM page.

When processor P allocates virtual memory page, vmk, to shared virtual memory page, svmi, the following steps occur:

kernel obtains a free adapter physical memory page, pml
   kernel creates a node PT entry (vmk-to-pml, svm mapping indicator)
   supervisor allocates svmi off free list after checking protections
   kernel creates adapter PT entry pml-to-svmi
   supervisor updates network routing tables
   supervisor obtains svmi page contents for vmk
   kernel marks new node PT and adapter PT entries valid.

When processor Pj frees virtual memory page, vmk, from shared virtual memory page, svmi, the following steps occur:

supervisor updates network routing tables
   supervisor updates SVM free list
   kernel invalidates and deletes adapter PT entry pml-to-svmi
   kernel invalidates and deletes node PT entry vmk-to-pml
   kernel returns pml to adapter free memory list.

When processor Pj attaches virtual memory page, vmk, to shared virtual memory page, svmi, the following steps occur:

kernel verifies node PT entry maps vmk-to-svmi
   supervisor checks protections for svmi
   select any free adapter physical page pml
   supervisor updates network routing tables
   kernel finds old adapter PT entry for vmk and updates to vmk-to-pml
   supervisor obtains page contents for vmk
   kernel marks the node's page table and adapter page table entries valid.

When processor Pj detaches virtual memory page, vmk, from shared virtual memory page, svmi, the following steps occur:

kernel marks vmk-to-pml entry in node PT invalid
   kernel marks pml-to-svmi entry in adapter PT invalid
   supervisor updates network routing tables
   kernel adds pml to local adapter free memory list.

A programmer having skill in the art will be able to readily implement the necessary modifications to an existing node having the inventive adapter inserted therein. Optimally, as noted above, a network in accordance with the invention will not only include various nodes having the adapters resident therein; but will also have a switch arrangement including at least one switch port associated with each networked node and further connected to a switch bus, in accordance with the descriptions set forth above. Although the present invention has been shown and described with respect to preferred embodiments, various changes and modifications which are obvious to persons skilled in the art are deemed to lie within the spirit and scope of the invention. The numerous changes and modification can be made while staying within the scope of the invention which is set forth in the appended claims.

What is claimed is:

1. Apparatus at a first node to update a first memory location, each said first node having at least one first processor, first operating system and first memory location with first virtual memory location address, said first node connected in a network to a plurality of second nodes, each said second node having at least one second processor, second operating system and second memory location having a second virtual memory location address, wherein said first memory location and said plurality of second memory locations contain shared memory values, each said first node having at least one page table containing virtual addresses and physical addresses of said first memory locations at said first node and of said second memory locations at said plurality of second nodes, comprising:

(a) link hardware means at said first node for receiving a packet from said network containing an update value and said first virtual memory location address;

(b) means for accessing said at least one page table to translate said first virtual memory location address to a physical memory address corresponding to said first memory location; and (c) means for updating, with said physical memory address, said first memory location with said update value;

whereby said receiving means and said updating means operate atomically independent of the operation of said first operating system.

2. A system for updating shared memory comprising an apparatus at a first node to provide an update value to a plurality of second nodes, each said first node having at least one first processor, first operating system, and first memory location having a first virtual memory location address, said first node being connected in a network to a plurality of second nodes, each said second node having at least one second processor, second operating system and second memory location having a second virtual memory location address, wherein said first memory location and said plurality of second memory locations contain shared memory values, comprising:

(a) link hardware means at said first node for receiving a first packet from said network containing an update value and said first virtual memory location address; and (b) updating means for updating with said first virtual memory location address and said first memory location;

(c) a first page table means containing virtual addresses and physical addresses of said first memory locations at said first node and of said second memory locations at said plurality of second nodes for obtaining, based on said first virtual memory location address, at least one said second memory location address corresponding to said first virtual memory location address; and (d) generating means for generating a second packet containing said second memory location address and said update value;

(e) sending means for sending said second packet to said plurality of second nodes; and whereby said generating means operates atomically independent of said first operating system.

3. The system of claim 2 wherein each of said plurality of second nodes includes:

(a) at least one second page table comprising virtual addresses and physical addresses for memory locations of said shared memory;

(b) link hardware means for receiving said second packet comprising said virtual memory location address and said update value; and (c) updating means for updating at said physical address, said second memory location;

whereby said link hardware means, said second page table and said updating means function atomically independent of the operation of said second operating system.

4. An apparatus for a first node to update a first memory location and to propagate a command based thereon to a network of nodes, each said first node having at least one first processor, first operating system and said first memory location with first virtual memory location address, said first node connected in a network to a plurality of second nodes, each said second node having at least one second processor, second operating system and second memory location having a second virtual memory location address, wherein said first memory location and said plurality of second memory locations contain shared memory values, said apparatus comprising:

(a) first link hardware means for receiving at said first node a first network packet containing said update value and a first virtual memory location address;

(b) updating means for updating said first memory location with said first virtual memory location address;

(c) atomically generating means for atomically generating a command packet comprising at least one command based upon said update value;

(d) sending means for sending said command packet to each said second node;

(e) second link hardware means for receiving said command packet at each said second node; and (f) executing means for executing said command at each said second node;

whereby said link hardware, said updating, said generating and said sending means operate atomically independent of operation of said first operating system, and said receiving and executing means operate atomically independent of the operation of said second operating system.

5. An apparatus for updating shared virtual memory among shared memory locations having addresses, said shared memory locations being associated with a first node, said first node having a first operating system and at least one first page table, said shared memory locations also being associated with at least one second node, said second node connected to said first node through a network, and said second node having at least one second operating system and at least one second page table, said apparatus comprising:

(a) memory mapping means for memory mapping said shared memory locations into said page tables;

(b) multicasting means for multicasting a packet, containing at least one shared memory update and a virtual address for at least one said shared memory location, from said first node to said at least one second node;

(c) link hardware means for receiving said packet at said at least one second node;

(d) accessing means for accessing said at least one second page table;

(e) page table means for finding said shared memory location corresponding to said virtual address at said at least one second node; and (f) updating means for updating said shared memory location at said at least one second node with said shared memory update;

whereby said memory mapping means, said multicasting means, said link hardware means, said accessing means, said page table means and said updating means operate atomically independent of the operation of said first and said at least one second operating systems.

6. The apparatus of claim 5 wherein said network includes at least one third node having at least one third operating system, at least one third shared memory location having a third shared memory address and at least one third page table and at least one second node, further comprising:

(a) assembling means for assembling a second packet containing said update and said third shared memory address for transmission to said at least one third node; and (b) sending means for sending said second packet to said third node;

whereby said assembling means and said sending means operate atomically independent of the operation of said at least one second operating system.

* * * * *